United States Patent
Leff et al.

(10) Patent No.: US 8,631,049 B2
(45) Date of Patent: Jan. 14, 2014

(54) CONSTRUCTING DECLARATIVE COMPONENTIZED APPLICATIONS

(75) Inventors: Avraham Leff, Spring Valley, NY (US); James Thomas Rayfield, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/431,538

(22) Filed: Mar. 27, 2012

(65) Prior Publication Data

US 2012/0191761 A1 Jul. 26, 2012

Related U.S. Application Data

(63) Continuation of application No. 12/486,252, filed on Jun. 17, 2009, now Pat. No. 8,250,112, which is a continuation of application No. 11/341,557, filed on Jan. 26, 2006, now abandoned.

(51) Int. Cl.
*G06F 17/00* (2006.01)

(52) U.S. Cl.
USPC .......................................... 707/803

(58) Field of Classification Search
USPC .......................................... 707/802
See application file for complete search history.

(56) References Cited

U.S. PATENT DOCUMENTS

| | | | |
|---|---|---|---|
| 4,558,413 A | 12/1985 | Schmidt et al. | |
| 5,201,046 A | 4/1993 | Goldberg et al. | |
| 5,495,605 A | 2/1996 | Cadot | |
| 5,581,758 A | 12/1996 | Burnett et al. | |
| 5,684,984 A | 11/1997 | Jones et al. | |
| 5,765,159 A | 6/1998 | Srinivasan | |
| 5,850,554 A | 12/1998 | Carver | |
| 6,014,670 A | 1/2000 | Zamanian et al. | |
| 6,023,702 A | 2/2000 | Leisten et al. | |
| 6,374,252 B1 | 4/2002 | Althoff et al. | |
| 6,728,713 B1 | 4/2004 | Beach et al. | |
| 6,732,087 B1 | 5/2004 | Hughes et al. | |
| 6,768,986 B2 | 7/2004 | Cras et al. | |
| 6,938,041 B1* | 8/2005 | Brandow et al. | 1/1 |
| 7,349,837 B2 | 3/2008 | Martin et al. | |
| 2002/0062305 A1 | 5/2002 | Gawne-Cain | |
| 2002/0073089 A1 | 6/2002 | Schwartz et al. | |
| 2002/0087516 A1 | 7/2002 | Cras et al. | |

(Continued)

OTHER PUBLICATIONS

R. Strom et al., "A New Programming Methodology for Long-Lived Software Systems," IBM J. Res. Develop., Jan. 1984, pp. 52-59, vol. 28, No. 1.

(Continued)

*Primary Examiner* — Syed Hasan
*Assistant Examiner* — Kurt Mueller
(74) *Attorney, Agent, or Firm* — William Stock; Ryan, Mason & Lewis, LLP (57) ABSTRACT

Techniques for constructing a software application are provided. A data model of the application is represented as a relational model. Control logic of the application is defined to specify each of a plurality of operations of the application as a mapping from a current state of the application data model and one or more current application inputs to a new state of the application data model and one or more application outputs, described by one or more relational algebra operations selected from the group consisting of a relation-complement operation, a disjunction operation and a conjunction operation.

15 Claims, 7 Drawing Sheets

(56) References Cited

U.S. PATENT DOCUMENTS

| | | | |
|---|---|---|---|
| 2003/0046311 A1 | 3/2003 | Baidya et al. | |
| 2003/0055868 A1 | 3/2003 | Fletcher et al. | |
| 2003/0088715 A1 | 5/2003 | Chaudhuri et al. | |
| 2003/0200538 A1 | 10/2003 | Ebeling et al. | |
| 2003/0217063 A1 | 11/2003 | Tomic et al. | |
| 2003/0225752 A1 | 12/2003 | Bakalash et al. | |
| 2004/0015814 A1 | 1/2004 | Trappen et al. | |
| 2004/0031030 A1 | 2/2004 | Kidder et al. | |
| 2004/0073565 A1 | 4/2004 | Kaufman et al. | |
| 2004/0225952 A1 | 11/2004 | Brown et al. | |
| 2004/0230444 A1 | 11/2004 | Holt et al. | |
| 2005/0102615 A1* | 5/2005 | Roman et al. | 715/513 |
| 2005/0166193 A1 | 7/2005 | Smith et al. | |
| 2005/0187955 A1 | 8/2005 | Bahulkar et al. | |
| 2005/0256892 A1 | 11/2005 | Harken | |
| 2006/0106585 A1 | 5/2006 | Brown et al. | |
| 2006/0112114 A1 | 5/2006 | Yu et al. | |

OTHER PUBLICATIONS

E.F. Codd, "A Relational Model of Data for Large Shared Data Banks," Information Retrieval, Communications of the ACM, Jun. 1970, pp. 377-387, vol. 13, No. 6.

Charles Petzold, "Create Real Apps Using New Code and Markup Model," MSDN Magazine, 2005, 10 pages.

"IBM Rational Application Developer for WebSphere Software Version 6.0," IBM Corporation, 2004, pp. 1-8.

"IBM Rational Web Developer for WebSphere Software Version 6.0," IBM Corporation, 2004, pp. 1-8.

D. Dey et al., "A Probabilistic Relational Model and Algebra," ACM Transactions on Database Systems, Sep. 1996, pp. 339-369, vol. 21, No. 3.

A.K. Sharma et al., "An Extended Relational Algebra for Fuzzy Multidatabases," IEEE, Proceedings of the 7th International Symposium on Parallel Architectures, Algorithms and Networks (ISPAN), May 2004, 6 pages.

* cited by examiner

*FIG. 1*

CRUD++ APPLICATION SCREENSHOT

FIG. 2
CREATE OPERATION

FIG. 3
UPDATE OPERATION

FIG. 4
DELETE OPERATION

FIG. 5
INCREMENT OPERATION

FIG. 6
VIEW UPDATE
(RETRIEVE OR INCREMENT)

CONSTRUCTING DECLARATIVE COMPONENTIZED APPLICATIONS

CROSS-REFERENCE TO RELATED APPLICATION(S)

This application is a continuation of U.S. application Ser. No. 12/486,252, filed on Jun. 17, 2009, which is a continuation of a U.S. application Ser. No. 11/341,557, filed on Jan. 26, 2006, the disclosures of which are incorporated by reference herein in their entireties.

FIELD

The field relates generally to approaches for constructing a user interactive software application.

BACKGROUND

Numerous attempts have been made to construct software applications out of "components," or reusable pieces of software. These desired construction techniques are analogous to an often used manner of building hardware systems out of prepackaged pieces, more specifically chips, by creating custom interconnections. By using a construction approach utilizing components, it is believed that the software construction cost will be reduced or, alternatively, that the software construction productivity will increase, when compared to techniques that start anew for each new software application.

Software components declare a set of inputs and outputs, which are used to communicate with other components in the system. Such inputs and outputs may be considered analogous to pins on a chip in hardware system construction. Ideally the components are completely encapsulated, in that they only communicate via the declared input and output ports. The encapsulation of components provides numerous benefits. For example, encapsulated components may be replaced by other implementations, as long as the inputs, outputs, and semantics are identical. Additionally, applications built from encapsulated components are easier to analyze, optimize, and transform, because there is no need for the system to analyze internal implementations of the components.

An example of an encapsulated component system is the NIL programming language. See, for example, "A New Programming Methodology for Long-Lived Software Systems," IBM J. Res. Develop., Vol. 28, No. 1, January 1984.

Another useful approach to reducing software complexity and improving software productivity is declarative programming. Declarative programming attempts to describe the desired behavior or goals of the system, the "what," but leaves the specific implementation of the system, the "how," undefined. In declarative programming it is reasoned that only the behavior is important, and a description of the implementation is an unnecessary loss of productivity. Examples of declarative programming languages include Haskell and Prolog. In contrast, most applications today are implemented in imperative programming languages, such as Java and C++. Imperative languages are used to describe the application using a step-by-step approach, for example, first, read input field 1; second, display a message in text-box 2.

Imperative languages typically have the concept of a "program counter" which indicates exactly where the flow of execution is at all times, and the ability to set "breakpoints", which suspend the program when the flow of execution reaches a certain location in the program, utilized, for example, for debugging. In contrast, declarative programs do not have a concept analogous to a program counter. Note that declarative systems may be implemented using imperative languages.

Virtually all applications require access to data, which is typically stored in a database. A relational model, which provides access to data using relational algebra has been the most successful approach yet devised for storing and accessing data (see "A Relational Model of Data for Large Shared Data Banks", Communications of the ACM, Vol 13 No. 6, June 1970). In its pure form, the relational model and algebra provide a declarative approach to accessing data. More specifically, they describe what data is desired, but not how to retrieve it. While componentization, the relational model, relational algebra, and declarative programming techniques and their respective benefits are well known, they have not been applied together in an existing system.

As a counter-example, the Microsoft Windows Presentation Foundation (formerly named "Avalon") explicitly mixes declarative descriptions of visual layouts with imperative (non-declarative) procedural code (see "Code Name Avalon: Create Real Apps Using New Code and Markup Model", MSDN Magazine, January 2004). Microsoft states that [imperative] programming languages are "clunky for the job of laying out text, images, and controls", and declarative ("markup") approaches are "hopelessly inept when it comes time to interact with the user". Thus both approaches must be used together in Avalon. The declarative part of the application ("XAML") must be supplemented by "real [imperative] programming code", which is embedded directly in XAML or placed in a separate file.

SUMMARY

Embodiments of the present invention provide a system and method for constructing componentized applications based on declarative programming including relational databases and relational algebra.

For example, in one embodiment of the present invention, a method of constructing a software application is provided. A data model of the application is represented as a relational model. Techniques for constructing a software application are provided. A data model of the application is represented as a relational model. Control logic of the application is defined to specify each of a plurality of operations of the application as a mapping from a current state of the application data model and one or more current application inputs to a new state of the application data model and one or more application outputs, described by one or more relational algebra operations selected from the group consisting of a relation-complement operation, a disjunction operation and a conjunction operation.

In additional embodiments of the present invention, an apparatus and an article of manufacture for constructing a user interactive software application are provided.

The embodiments of the present invention allow a model, view, and controller to all be specified in a declarative fashion, avoiding the need to adapt between declarative and procedural/imperative styles within the application description.

These and other objects, features and advantages of the present invention will become apparent from the following detailed description of illustrative embodiments thereof, which is to be read in connection with the accompanying drawings.

DETAILED DESCRIPTION

As will be illustrated in detail below, embodiments of the present invention introduce techniques for constructing a user interactive software application based on a relational model and relational algebra. More specifically, embodiments of the present invention will be explained below in the context of an illustrative application, CRUD++ (create, retrieve, update, delete and increment). The application is illustrative in that it shows how a graphical user-interface (GUI) front end enables users to drive the four basic database operations (create, retrieve, update and delete), as well as perform an application-specific function (increment). However, it is to be understood that the present invention is not limited to such a particular software application environment. Rather, the invention is more generally applicable to the description and implementation of any application which may be described in terms of a model-view-controller software architecture scheme.

Figure 1:
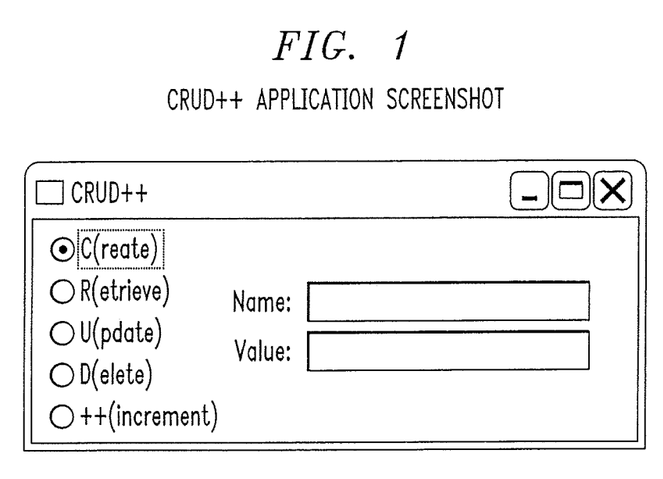
FIG. 1 is screen capture of a sample software application, CRUD++, according to an embodiment of the present invention.

Referring initially to FIG. 1, a screen capture of the sample CRUD++ application is provided. The application allows the user to create, retrieve, update, and delete mappings from a specified name to a specified value. The current value associated with a specified name may also be incremented, if it is a numeric value. A desired operation of the software application is selected via radio buttons disposed on the left side of the screen capture, or view.

Figure 2:
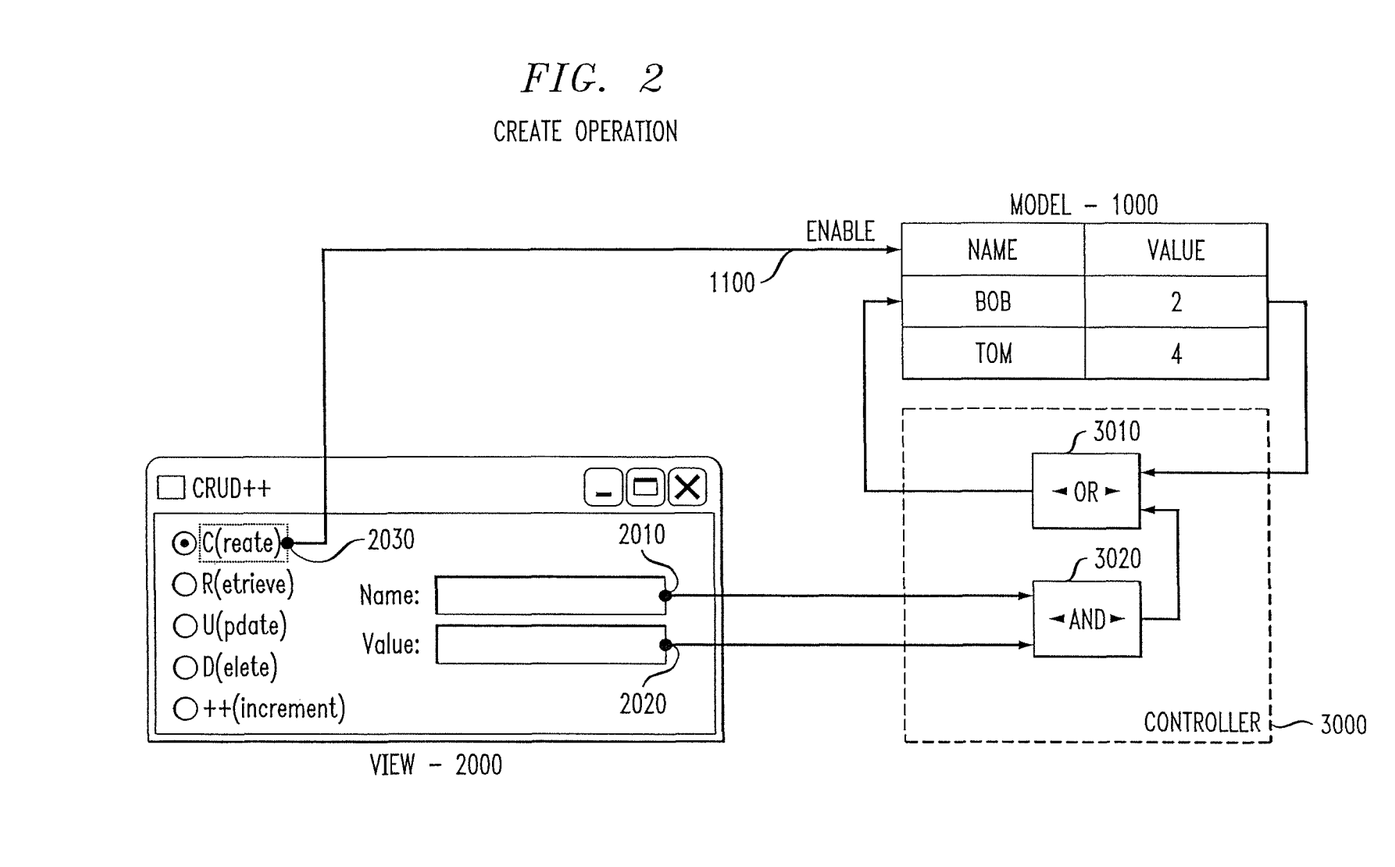
FIG. 2 is a diagram illustrating an architectural description of a create operation for the sample software application, according to an embodiment of the present invention.

Referring now to FIG. 2, a diagram illustrates an architectural description of a create operation for the sample software application, according to an embodiment of the present invention. FIG. 2 provides a common application model 1000, a common application view 2000, and a common application controller 3000.

View 2000 may be designed in a graphical editor tool, such as, for example, IBM Rational Web Developer for WebSphere Software (see "IBM Rational Web Developer for WebSphere Software Version 6.0", IBM Publication GC34-2465-00, 2004), or Macromedia Dreamweaver (see "Dreamweaver MX 2004: The Missing Manual", ISBN 0596006314, O'Reilly Media, Inc., 2003). View 2000 contains two text-entry fields, name field 2010 and value field 2020. The text-entry fields are GUI widgets such as, for example, Eclipse standard widget toolkit (SWT), Java Swing or another widget technology. All operations require a text entry in name field 2010 to be supplied by the user; however the retrieve, delete, and increment operations do not require such a text entry in value field 2020. In accordance with the embodiments of the present invention, the user-supplied text in name field 2010 is denoted as name and the user-supplied text in value field 2020 is denoted as value.

View 2000 is connected to a relational algebra description of controller 3000, expressed as a graph of components which represent relational algebra operations. In the preferred embodiment of the present invention, the relational algebra operations are modeled on relational algebra "A" as described in C. J. Date et al., "Foundation for Object/Relational Databases: The Third Manifesto," ISBN 0-201-30978-5 (Chapter 4). In other embodiments, alternative formulations of relational algebra, which are known to those skilled in the art, may be used. Note that in the preferred embodiment, the outputs of the view components are architected as relations, so that they are compatible with the relational-algebra blocks of controller 3000, and the relational model 1000.

The application model 1000 that comprises the data used by the application is described in terms of a relational database. FIG. 2 illustrates model 1000 having a single relation, NameValue, comprised of two attributes, that associates a name with a value. The relational database of model 1000 may be designed by a tool such as, for example IBM Rational Application Developer for WebSphere (see "IBM Rational Application Developer for WebSphere Software Version 6.0", IBM Publication GC34-2464-00), or DDS-Pro.

The description of application controller 3000 is provided in a declarative fashion so that it is integrated with view 2000 and model 1000, and may be executed directly from the application description. In the preferred embodiment of the present invention, the application description is in a graphical form, although other embodiments may be used, such as, for example, extensible markup language (XML). Further, in the preferred embodiment of the present invention, the application description may be compiled into an intermediate form before execution.

FIG. 2 shows the preferred embodiment for the description of the create operation in the sample CRUD++ application. Text entries, name, in name field 2010, and value, in value field 2020, are passed to an AND block 3020 which produces a tuple containing <Name name, Value value>. This tuple is connected to OR block 3010, which produces a new value for model 1000 containing the previous contents of model 1000 plus the additional tuple. This creates the name, value pair in the database. Note that model 1000 is only updated through an enable signal 1100, when create radio button 2030 is selected from view 2000.

Figure 3:
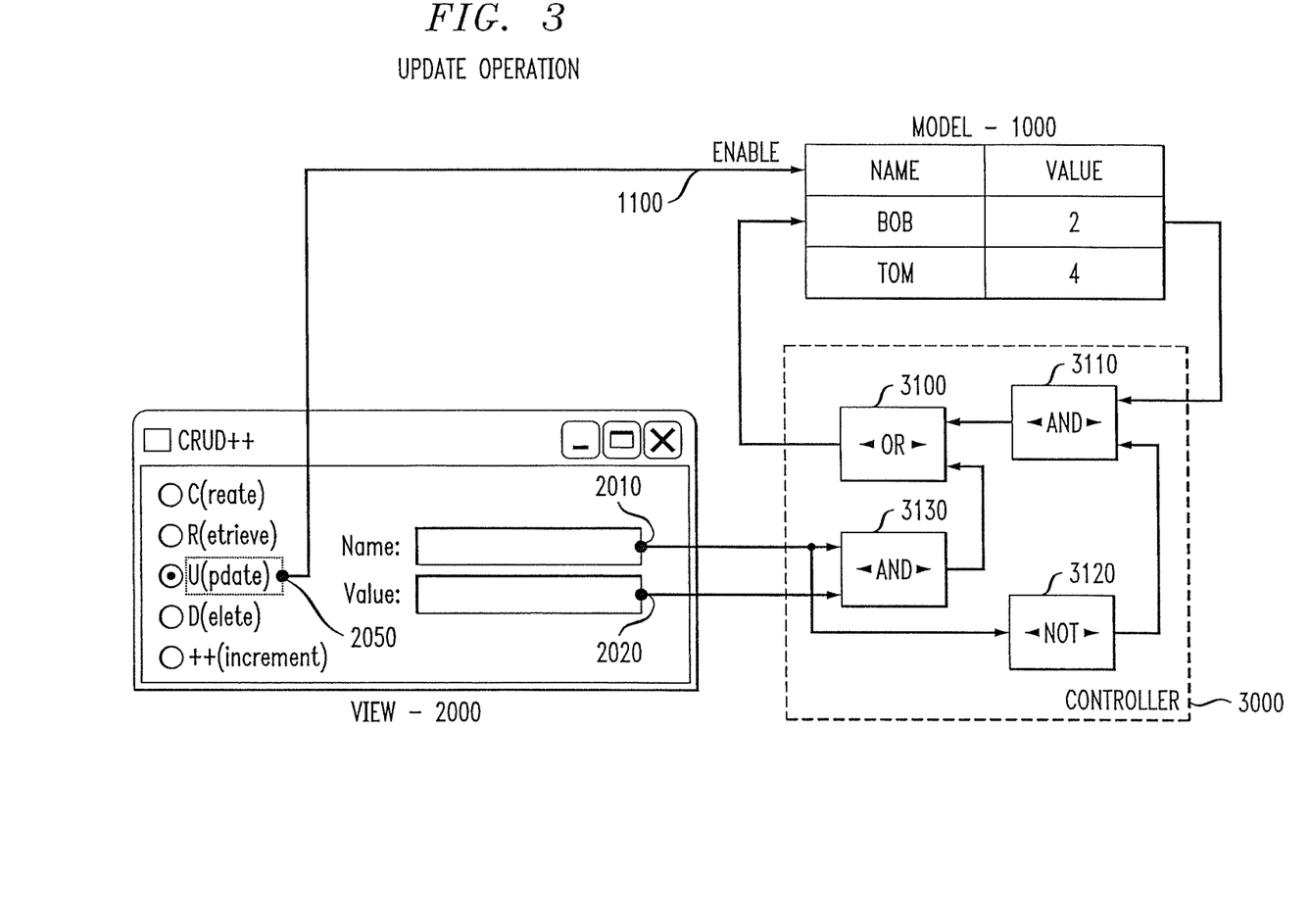
FIG. 3 is a diagram illustrating an architectural description of an update operation for the sample software application, according to an embodiment of the present invention.

Referring now to FIG. 3, a diagram illustrates an architectural description of an update operation for the sample software application, according to an embodiment of the present invention. A text entry, name, in name field 2010, is connected to a NOT block 3120, which performs a relation-complement operation. More specifically, the output of block 3120 contains every name except name specified by name field 2010. The output of NOT block 3120 and the current contents of model 1000 are passed to an AND block 3110 to produce an output having any tuples containing name removed. Text entries, name and value, are connected to an AND block 3130 to produce a tuple <Name name, Value value>. The tuple from AND block 3130 is connected to an OR block 3100 together with the result of AND 3110 to produce the new value for model 1000 containing an updated Value value for Name name. Note that model 1000 is only updated through enable signal 1100, when an update radio button 2050 is selected from view 2000.

Figure 4:
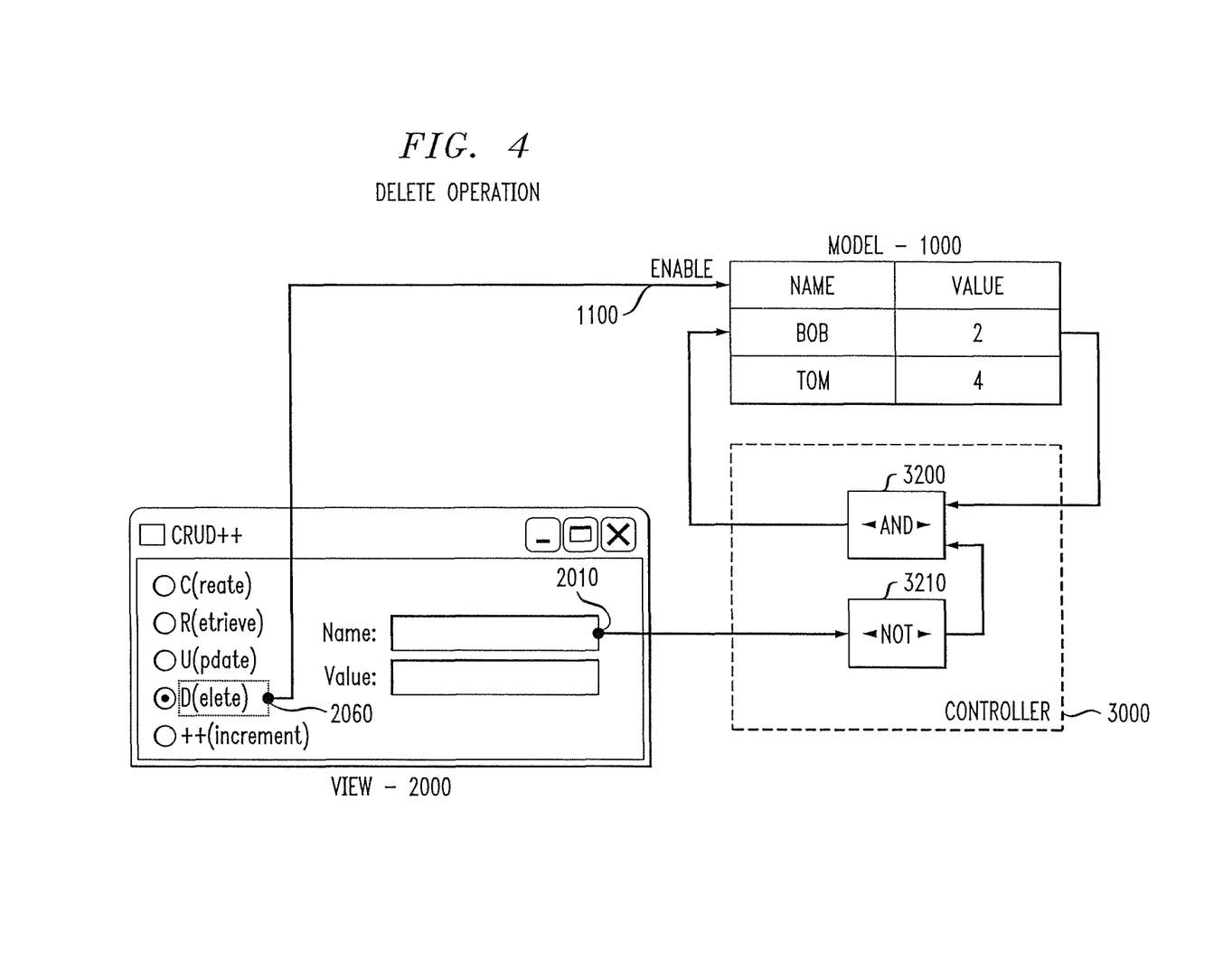
FIG. 4 is a diagram illustrating an architectural description of a delete operation for the sample software application, according to an embodiment of the present invention.

Referring now to FIG. 4, a diagram illustrates an architectural description of a delete operation for the sample software application, according to an embodiment of the present invention. Text entry, name, from name field 2010 is connected to a NOT block 3210 which performs a relation-complement operation. The output of NOT block 3210 and the current contents of model 1000 are passed to an AND block 3200 to produce an output with any tuples containing name removed. Note that model 1000 is only updated through enable signal 1100, when a delete radio button 2060 is selected from view 2000.

Figure 5:
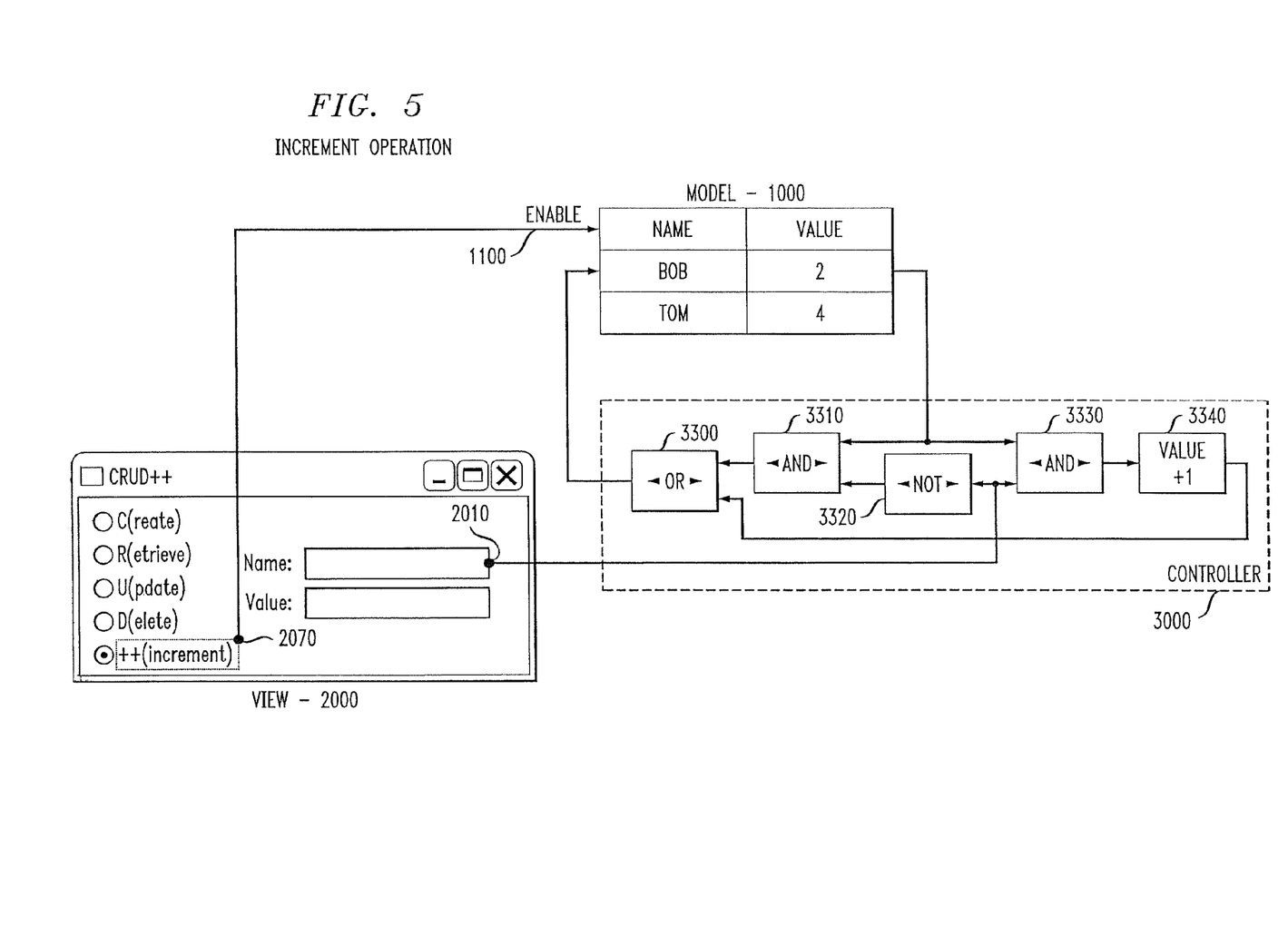
FIG. 5 is a diagram illustrating an architectural description of an increment operation for the sample software application, according to an embodiment of the present invention.

Referring now to FIG. 5, a diagram illustrates an architectural description of an increment operation for the sample software application, according to an embodiment of the present invention. Text entry, name, from name field 2010 is connected to a NOT block 3320 which performs a relation-complement operation. The output of NOT block 3320 and the current contents of model 1000 are passed to an AND block 3310 to produce an output with any tuples containing name removed. Text entry, name, from name field 2010 is also connected to an AND block 3330 which also receives the current value of model 1000. AND block 3330 produces a tuple containing <Name name, Value value>, where value is the current value of name in model 1000. <Name name, Value value> is connected to a combinatorial expression block 3340 which adds 1 to value, producing a new tuple <Name name, Value value+1>. This tuple is fed to OR block 3300, together with the output of AND block 3310. The output of OR block 3300 is the new content of model 1000 with <Name name, Value value+1> replacing <Name name, Value value>. Note that model 1000 is only updated through enable signal 1100, when an "++(increment)" radio button 2070 is selected from view 2000.

Figure 6:
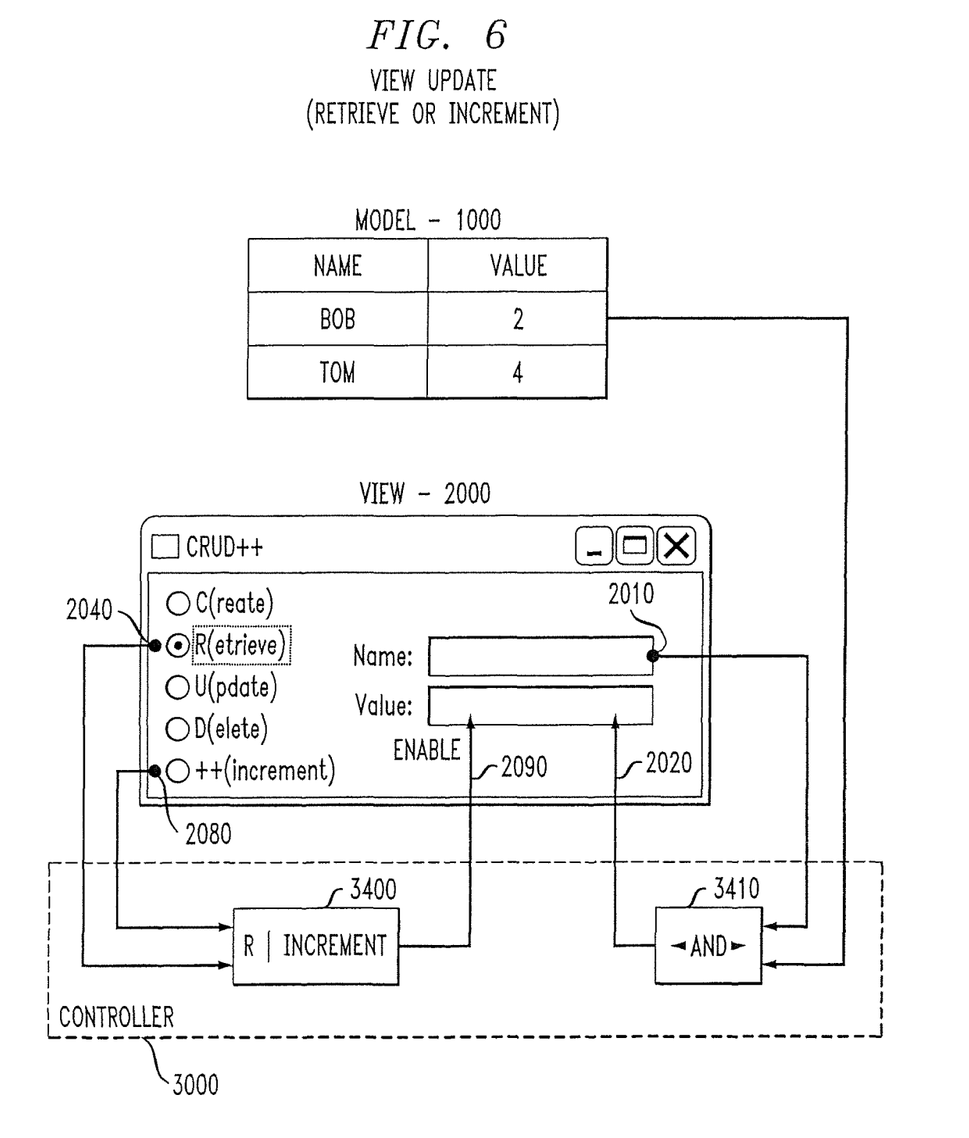
FIG. 6 is a diagram illustrating an architectural description of a view update for the sample software application, according to an embodiment of the present invention.

Referring now to FIG. 6, a diagram illustrates an architectural description of a view update for the sample software application, according to an embodiment of the present invention. View 2000 may be updated in response to selection of a retrieve operation or an increment operation. Text entry, name, from name field 2010 is fed to an AND block 3410 together with the current content of model 1000 to produce a tuple <Name name, Value value>, where value is the current value of name. Value field 2020 in view 2000 is updated with value through enable signal 2090, when a retrieve 2040 or ++(increment) 2080 radio button is selected, as determined by combinatorial expression block 3400. Note that in the preferred embodiment, updateable view components are architected in a manner similar to that of model 1000, in that their interfaces are relations, so that they are compatible with the output(s) of controller 3000 and model 1000. In the preferred embodiment, updateable view components are provided with an enable input, so that controller 3000 can control whether they are updated.

Figure 7:
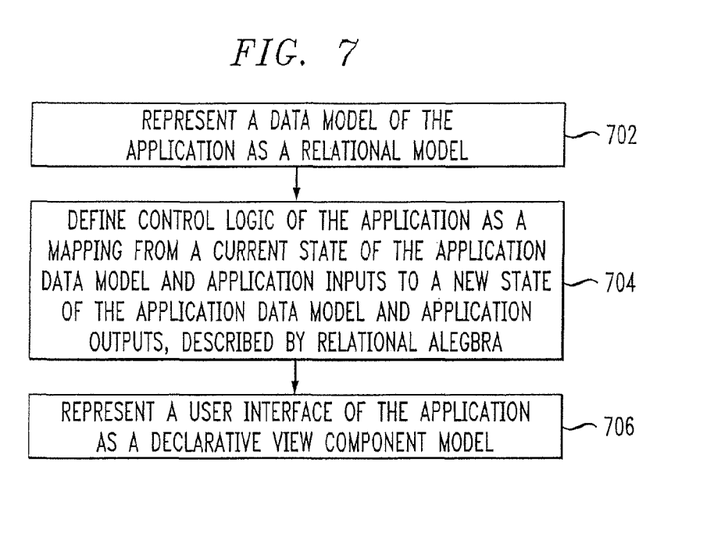
FIG. 7 is a flow diagram illustrating an interactive software application construction methodology, according to an embodiment of the present invention.

Referring now to FIG. 7, a flow diagram illustrates an interactive software application construction methodology, according to an embodiment of the present invention. The methodology begins in block 702 where a data model of the application is represented as a relational model. For example, a relational model is illustrated as model 1000 in FIGS. 2-6. In block 704, control logic of the application is defined as a mapping from the current application state and application inputs to a new application state and application outputs, described by relational algebra components. For example, control logic is illustrated in controller 3000 in FIGS. 2-6. One or more transitions between states of the data model are described as application flow. Finally, in block 706, a user-interface of the application is represented as a declarative view component model. For example, a user-interface is illustrated as view 2000 in FIGS. 2-6. Note that in alternative embodiments (e.g. non-visual or non-interactive (batch) applications), step 706 may be modified or omitted.

Figure 8:
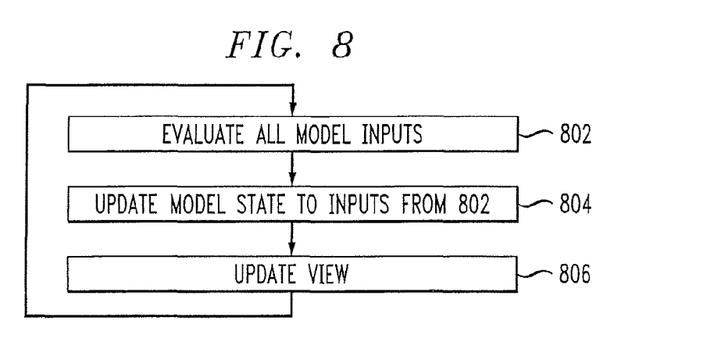
FIG. 8 is a flow diagram illustrating a software application flow methodology, according to an embodiment of the present invention.

Referring now to FIG. 8, a flow diagram illustrates a software application flow methodology, according to an embodiment of the present invention. In the preferred embodiment, applications may be executed directly from their graphical descriptions.

The methodology begins in block 802 where all inputs to model 1000 are evaluated. For example, in FIG. 2, enable input 1100 from create radio button 2030 and the output of OR block 3010 would be evaluated. In the preferred embodiment of the present invention, evaluation proceeds recursively. More specifically, an evaluation of OR block 3010 triggers an evaluation of AND block 3020. This continues until the recursion terminates at the current state of model 1000 and/or the current state of view 2000. In the preferred embodiment, relational-algebra blocks of controller 3000 form a directed acyclic graph (DAG), so that a recursive evaluation algorithm eventually terminates successfully. Those skilled in the art will recognize that other evaluation strategies are possible for the relational algebra blocks.

In block 804 of FIG. 8, model 1000 is updated with the values computed in step 802. For example, in FIG. 2, model 1000 is updated to include the new tuple <Name name, Value value>. Finally, in block 806, view 2000 is updated using input values from view 2000 and updated model 1000. For example, in FIG. 6, Value 2020 is updated with a value attribute from AND block 3410, if retrieve radio button 2040 or ++(increment) radio button 2080 is selected.

In the preferred embodiment, the execution of the algorithm of FIG. 8 is triggered by events from the view component(s). For example, clicking a button or entering text will cause execution of the algorithm of FIG. 8. In other embodiments, non-view actions, such as database triggers, may cause the execution of the algorithm of FIG. 8.

Figure 9:
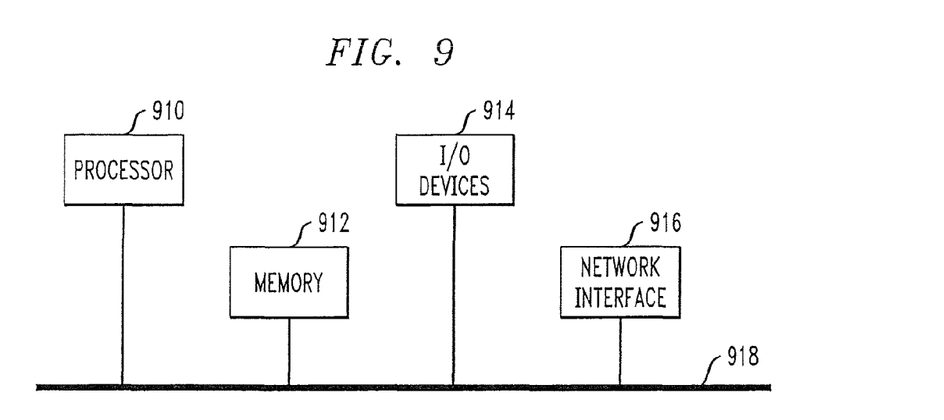
FIG. 9 is a block diagram illustrating an exemplary hardware implementation of a computing system in accordance with which one or more components/methodologies may be implemented, according to an embodiment of the present invention.

Referring now to FIG. 9, a block diagram illustrates an exemplary hardware implementation of a computing system in accordance with which one or more components/methodologies of the invention (e.g., components/methodologies described in the context of FIGS. 1-8) may be implemented, according to an embodiment of the present invention.

As shown, the computer system may be implemented in accordance with a processor 910, a memory 912, I/O devices 914, and a network interface 916, coupled via a computer bus 918 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Methods of this invention may be implemented by an apparatus which provides the functions carrying out the steps of the methods. Apparatus and/or systems of this invention may be implemented by a method that includes steps to produce the functions of the apparatus and/or systems.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus, the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method of constructing a software application comprising the steps of:
   representing a data model of the application as a relational model;
   defining control logic of the application to specify each of a plurality of operations of the application as a mapping from a current state of the application data model and one or more current application inputs to a new state of the application data model and one or more application outputs, wherein the mapping is described by a graph of one or more components representing respective relational algebra operations selected from the group consisting of a relation-complement operation, a disjunction operation and a conjunction operation, wherein the operations of the application comprise a create operation, a retrieve operation, an update operation, and a delete operation; and
   representing a user-interface of the application as a declarative view component model, wherein:
     in the step of representing a user-interface, the user-interface comprises text entry fields;
     a first component of the components representing respective relational algebra operations in the graph receives a text entry input from a text entry field of the user interface and feeds an output to a second component of the components representing respective relational algebra operations in the graph;
     the second component further receives as an input contents of the application data model representing the current state of the application data model and outputs a new value to the application data model; and
     each of the steps is performed at least in part by a computer; and wherein:
     in the create operation, the first component represents the conjunction operation, which is performed on the text entry input and another value, and the second component presents the disjunction operation, which is performed on the output from the first component and the contents of the application data model; and
     in the update and delete operations, the first component represents the relation-complement operation, which is performed on the text entry input, and the second component represents the conjunction operation, which is performed on the output from the first component and the contents of the application data model.

2. The method of claim 1, wherein the data model comprises a relational database comprising a plurality of entries, each entry representing a mapping from a specified name to a specified value.

3. The method of claim 1, wherein, in the step of representing a user-interface, the user-interface enables user interaction to facilitate a change from the current state of the application data model to a new state of the application data model.

4. The method of claim 3, wherein the change from the current state to the new state of the application data model comprises the steps of:
   evaluating one or more inputs to the data model;
   updating the state of the data model in accordance with the one or more inputs; and
   updating the user-interface in accordance with the state of the data model.

5. The method of claim 4, wherein, in the step of evaluating one or more inputs, the evaluation is recursive until a state of the data model or of the user interface is defined.

6. The method of claim 1, wherein, in the step of representing a user-interface, the user-interface components have at least one of relational outputs and relational inputs.

7. The method of claim 1, wherein, in the step of defining control logic, the mapping comprises a directed-acyclic graph of the one or more components.

8. The method of claim 1, wherein the software application comprises a user-interactive software application.

9. The method of claim 6, wherein the at least one of relational outputs and relational inputs of the user-interface components respectively correspond to at least one of relational inputs and relational outputs of the one or more components representing respective relational algebra operations within the control logic of the application.

10. Apparatus for constructing a software application, comprising:
a memory; and
at least one processor coupled to the memory and operative to:
represent a data model of the application as a relational model;
define control logic of the application to specify each of a plurality of operations of the application as a mapping from a current state of the application data model and one or more current application inputs to a new state of the application data model and one or more application outputs, wherein the mapping is described by a graph of one or more components representing respective relational algebra operations selected from the group consisting of a relation-complement operation, a disjunction operation and a conjunction operation, wherein the operations of the application comprise a create operation, a retrieve operation, an update operation, and a delete operation; and
represent a user-interface of the application as a declarative view component model, wherein:
in the operation of representing a user-interface, the user-interface comprises text entry fields;
a first component of the components representing respective relational algebra operations in the graph receives a text entry input from a text entry field of the user interface and feeds an output to a second component of the components representing respective relational algebra operations in the graph; and
the second component further receives as an input contents of the application data model representing the current state of the application data model and outputs a new value to the application data model; and wherein:
in the create operation, the first comment represents the conjunction operation, which is performed on the text entry input and another value, and the second component represents the disjunction operation, which is performed on the output from the first component and the contents of the application data model; and
in the update and delete operations, the first component represents the relation-complement operation, which is performed on the text entry input, and the second component represents the conjunction operation, which is performed on the output from the first component and the contents of the application data model.

11. The apparatus of claim 10, wherein the data model comprises a relational database comprising a plurality of entries, each entry representing a mapping from a specified name to a specified value.

12. The apparatus of claim 10, wherein, in the operation of representing a user-interface, the user-interface enables user interaction to facilitate a change from the current state of the application data model to a new state of the application data model.

13. The apparatus of claim 12, wherein the change from the current state to the new state of the application data model comprises the steps of:
evaluating one or more inputs to the data model;
updating the state of the data model in accordance with the one or more inputs; and
updating the user-interface in accordance with the state of the data model.

14. The apparatus of claim 10, wherein, in the operation of representing a user-interface, the user-interface components have at least one of relational outputs and relational inputs.

15. An article of manufacture for constructing a software application, comprising a computer readable storage medium containing one or more programs which when executed by a processor implement the steps of:
representing a data model of the application as a relational model;
defining control logic of the application to specify each of a plurality of operations of the application as a mapping from a current state of the application data model and one or more current application inputs to a new state of the application data model and one or more application outputs, wherein the mapping is described by a graph of one or more components representing respective relational algebra operations selected from the group consisting of a relation-complement operation, a disjunction operation and a conjunction operation, wherein the operations of the application comprise a create operation, a retrieve operation, an update operation, and a delete operation; and
representing a user-interface of the application as a declarative view component model, wherein:
in the step of representing a user-interface, the user-interface comprises text entry fields;
a first component of the components representing respective relational algebra operations in the graph receives a text entry input from a text entry field of the user interface and feeds an output to a second component of the components representing respective relational algebra operations in the graph; and
the second component further receives as an input contents of the application data model representing the current state of the application data model and outputs a new value to the application data model; and wherein:
in the create operation, the first component represents the conjunction operation, which is performed on the text entry input and another value, and the second component represents the disjunction operation, which is performed on the output from the first component and the contents of the application data model; and
in the update and delete operations, the first component represents the relation-complement operation, which is performed on the text entry input and the second component represents the conjunction operation, which is performed on the output from the first component and the contents of the application data model.

* * * * *